United States Patent
Tateishi et al.

(10) Patent No.: US 11,584,247 B2
(45) Date of Patent: Feb. 21, 2023

(54) WIRELESS POWER FEEDING CONTROL APPARATUS FOR VEHICLE AND WIRELESS CHARGE SYSTEM FOR VEHICLE

(71) Applicant: SUBARU CORPORATION, Tokyo (JP)

(72) Inventors: Daigo Tateishi, Tokyo (JP); Ryohei Hoshi, Tokyo (JP); Hirofumi Yabe, Tokyo (JP); Fumiyuki Moriya, Tokyo (JP); Hidehiro Takagi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 541 days.

(21) Appl. No.: 16/683,019

(22) Filed: Nov. 13, 2019

(65) Prior Publication Data

US 2020/0207229 A1 Jul. 2, 2020

(30) Foreign Application Priority Data

Dec. 27, 2018 (JP) .............................. JP2018-244014

(51) Int. Cl.
*B60L 53/35* (2019.01)
*B60L 50/60* (2019.01)
(Continued)

(52) U.S. Cl.
CPC .............. *B60L 53/35* (2019.02); *B60L 50/60* (2019.02); *B60L 53/12* (2019.02); *B60L 53/60* (2019.02);
(Continued)

(58) Field of Classification Search
CPC .......... B60L 53/35; B60L 53/12; B60L 53/60; B60L 2240/30
See application file for complete search history.

(56) References Cited

U.S. PATENT DOCUMENTS

2012/0323423 A1 12/2012 Nakamura et al.
2016/0046194 A1* 2/2016 Tsukamoto ............. B60L 53/66
307/104
(Continued)

FOREIGN PATENT DOCUMENTS

JP 2002-037070 A 2/2002
JP 2008-055948 A 3/2008
(Continued)

OTHER PUBLICATIONS

Japanese Office Action dated Sep. 27, 2022, in corresponding Japanese Patent Application No. 2018-244014, with an English translation thereof.

*Primary Examiner* — Daniel Cavallari
(74) *Attorney, Agent, or Firm* — McGinn I.P. Law Group, PLLC.

(57) ABSTRACT

A wireless power feeding control apparatus for a vehicle includes a positioning unit and an examination unit. The vehicle is provided with a power receiving coil that wirelessly receives electrical power from a power transmitting coil of a power transmission facility, a parking lock mechanism, and a parking lock sensor that outputs an electrical signal corresponding to a locked state of a wheel established by the parking lock mechanism. The positioning unit positions the power transmitting coil or assists in positioning the power transmitting coil on the basis of a quantity of electricity generated by the power receiving coil receiving a magnetic field from the power transmitting coil subjected to weak excitation weaker than excitation during electrical power transmission. The examination unit checks the locked state of the wheel after the weak excitation is stopped and before the electrical power transmission is started.

18 Claims, 3 Drawing Sheets

(51) Int. Cl.
   *B60L 53/60* (2019.01)
   *B60L 53/12* (2019.01)
(52) U.S. Cl.
   CPC ....... *B60L 2210/40* (2013.01); *B60L 2240/30* (2013.01)

(56) References Cited

U.S. PATENT DOCUMENTS

2016/0126778 A1    5/2016  Kanahara et al.
2018/0278081 A1    9/2018  Kanahara et al.

FOREIGN PATENT DOCUMENTS

| JP | 2011-188679 A | 9/2011 | | |
|----|---------------|--------|---|---|
| JP | 2014-090601 A | 5/2014 | | |
| JP | 2016-092978 A | 5/2016 | | |
| JP | 2016-185066 A | 10/2016 | | |
| JP | 2016-226291 A | 12/2016 | | |
| SE | 16511768 A1 | * | 3/2018 | .............. B60L 11/18 |

* cited by examiner

WIRELESS POWER FEEDING CONTROL APPARATUS FOR VEHICLE AND WIRELESS CHARGE SYSTEM FOR VEHICLE

CROSS-REFERENCE TO RELATED APPLICATIONS

The present application claims priority from Japanese Patent Application No. 2018-244014 filed on Dec. 27, 2018, the entire contents of which are hereby incorporated by reference.

BACKGROUND

The disclosure relates to a wireless power feeding control apparatus and a wireless charge system that wirelessly feed electrical power from a power transmission facility to a vehicle including a power receiving coil.

There is a known technique for wirelessly feeding electrical power from a power transmitting coil of a power transmission facility to a power receiving coil of a power reception facility. For example, the power transmitting coil and the power receiving coil are positioned to face each other, and electrical power is fed from the power transmitting coil to the power receiving coil by electromagnetic action. Efficient feeding of electrical power is achieved by arranging the power receiving coil at an appropriate position relative to the power transmitting coil. An application of such a wireless power feeding technique to a vehicle is being studied. The application of such a technique requires the vehicle to be stopped in a stationary state during power feeding so as to prevent the power receiving coil from being displaced from the appropriate position.

SUMMARY

An aspect of the technology provides a wireless power feeding control apparatus for a vehicle. The vehicle is provided with a power receiving coil configured to wirelessly receive electrical power from a power transmitting coil of a power transmission facility, a parking lock mechanism, and a parking lock sensor configured to output an electrical signal corresponding to a locked state of a wheel established by the parking lock mechanism. The wireless power feeding control apparatus includes a positioning unit and an examination unit. The positioning unit is configured to perform positioning of the power receiving coil or assistance in the positioning of the power receiving coil on the basis of a quantity of electricity generated by the power receiving coil receiving a magnetic field from the power transmitting coil subjected to weak excitation weaker than excitation during electrical power transmission. The examination unit is configured to execute an examination process of checking the locked state of the wheel established by the parking lock mechanism after the weak excitation of the power transmitting coil is stopped and before the electrical power transmission by the power transmitting coil is started.

An aspect of the technology provides a wireless charge system for a vehicle. The wireless charge system includes a power transmission facility, a power receiving coil, a charger, a parking lock mechanism, a parking lock sensor, and a controller. The power transmission facility includes a power transmitting coil. The power receiving coil is configured to wirelessly receive electrical power from the power transmitting coil. The charger is coupled to the power receiving coil and configured to generate charging power corresponding to the electrical power from the power transmitting coil. The parking lock sensor is configured to output an electrical signal corresponding to a locked state of a wheel established by the parking lock mechanism. The controller is configured to perform positioning of the power receiving coil or assistance in the positioning of the power receiving coil on the basis of a quantity of electricity generated by the power receiving coil receiving a magnetic field from the power transmitting coil subjected to weak excitation weaker than excitation during electrical power transmission. The controller is also configured to check the locked state of the wheel established by the parking lock mechanism after the weak excitation of the power transmitting coil is stopped and before the electrical power transmission by the power transmitting coil is started.

Another aspect of the technology provides a wireless power feeding control apparatus for a vehicle. The vehicle is provided with a power receiving coil configured to wirelessly receive electrical power from a power transmitting coil of a power transmission facility, a parking lock mechanism, and a parking lock sensor configured to output an electrical signal corresponding to a locked state of a wheel established by the parking lock mechanism. The wireless power feeding control apparatus includes circuitry configured to subject the power transmitting coil to weak excitation weaker than excitation during electrical power transmission, detect the quantity of electricity generated at the power receiving coil receiving a magnetic field from the power transmitting coil subjected to the weak excitation, position the power receiving coil or assist in positioning the power receiving coil on the basis of the detected quantity of electricity, and check the locked state of the wheel established by the parking lock mechanism after the weak excitation of the power transmitting coil is stopped and before the electrical power transmission by the power transmitting coil is started.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

DETAILED DESCRIPTION

Some embodiments of the technology will now be described with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the technology are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
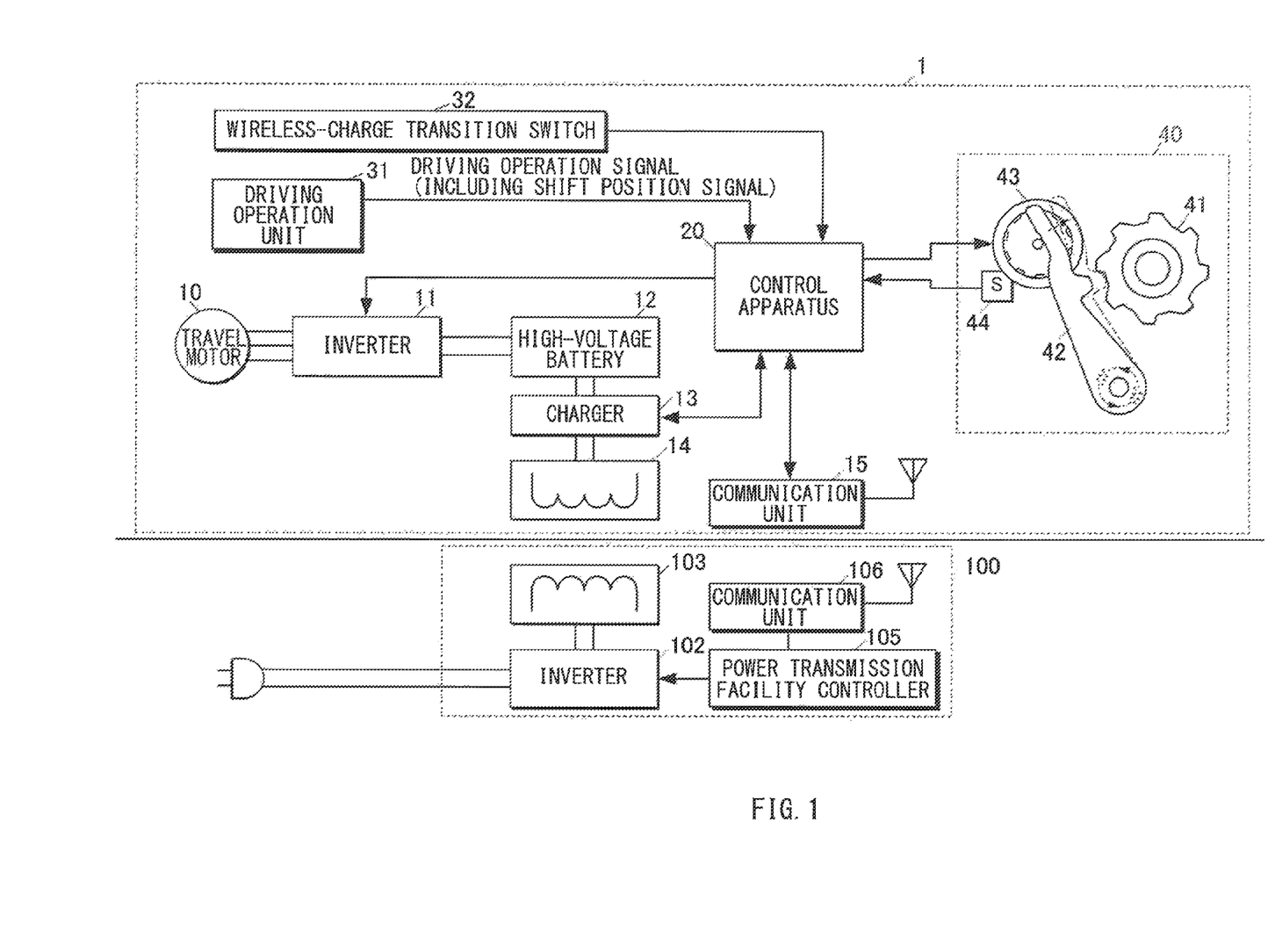
FIG. 1 is a block diagram illustrating a basic configuration example of a wireless charge system of a vehicle according to an embodiment of the technology.

FIG. 1 is a block diagram illustrating the basic configuration of a wireless charge system according to an embodiment of the technology.

A vehicle 1 according to an embodiment may be an electric vehicle including an electric travel motor 10 that serves as a drive source for driving. An example of the electric vehicle 1 may be an electric vehicle (EV) or a hybrid electric vehicle (HEV). The electric vehicle 1 may include the travel motor 10, an inverter 11, a high-voltage battery 12, a charger 13, a power receiving coil 14, a communication unit 15, a control apparatus 20, a driving operation unit 31, a wireless-charge transition switch 32, and a parking lock mechanism 40. The parking lock mechanism 40 may be operated, for example but not limited to, electrically or hydraulically. The electric parking lock mechanism 40 of the embodiment may include an electrically driven actuator 43. In one embodiment, the control apparatus 20 may serve as a "wireless power feeding control apparatus" and a "controller".

The high-voltage battery 12 may be a secondary battery, such as a lithium-ion secondary battery or a nickel-metal hydride secondary battery, that stores electrical power for traveling. The inverter 11 may convert the electrical power from the high-voltage battery 12 and output the converted power to the travel motor 10 under the control of the control apparatus 20. The travel motor 10 may receive electrical power from the inverter 11 and generate motive power that is to be transmitted to the driven wheels of the electric vehicle 1. The driving operation unit 31 may include a steering wheel, a shift lever, an accelerator pedal, a brake pedal, etc. The driving operation unit 31 may be operated by the driver and, in response, output a driving operation signal to the control apparatus 20. The driving operation signal may include a shift position signal base on an operation of the shift lever. The shift position may include a drive (D) range for forward driving of the electric vehicle 1, a reverse (R) range for backward driving of the electric vehicle 1, and a park (P) range for maintaining a stopped state of the electric vehicle 1. The control apparatus 20 may control the operation of the inverter 11 in accordance with a driving operation by the driver.

The power receiving coil 14 may be disposed in the lower portion of the body of the electric vehicle 1. The power receiving coil 14 receives electrical power from a power transmitting coil 103 by electromagnetic action.

In a wireless charging process, the charger 13 generates a charging current from the electrical power received from the power transmitting coil 103 via the power receiving coil 14, and may charge the high-voltage battery 12. The charger 13 may also detect the quantity of electricity (for example, an induced electromotive force) of the power receiving coil 14. During positioning of the power receiving coil 14, the charger 13 may detect the quantity of electricity generated at the power receiving coil 14 by the magnetic field of the power transmitting coil 103 subjected to excitation weaker than the excitation for electrical power transmission that generates a charge current by the charger 13. The detected quantity of electricity (for example, voltage value) may be sent to the control apparatus 20. Note that a detector that detects the quantity of electricity may be provided separately from the charger 13.

The wireless-charge transition switch 32 may be operated by a passenger (for example, the driver) of the electric vehicle 1. The wireless-charge transition switch 32 may be operated to start wireless charging near a power transmission facility 100 that allows for wireless charging.

The communication unit 15 may establish wireless communication with a communication unit 106 of the power transmission facility 100 to communicate data.

The parking lock mechanism 40 may electrically lock and unlock a wheel. The parking lock mechanism 40 may include a gear 41 coupled to the wheel, a locking arm 42 that restricts the rotation of the gear 41, an actuator 43 that pivots the arm 42, and a sensor 44 that detects the driving force of the actuator 43. When the shift position moves to the park position, the parking lock mechanism 40 may lock the wheel to establish a locked state of the wheel, under the control of the control apparatus 20. When the shift position moves to a position other than the park position, i.e., the drive or reverse position, the parking lock mechanism 40 may unlock the wheel to establish an unlocked state of the wheel. Although not particularly limited, the parking lock mechanism 40 may lock the gear 41 directly coupled to the driven wheel.

The arm 42 may be urged in a direction remote from the gear 41 by, for example, a spring. The arm 42 may be pushed by a movable part of the actuator 43 and thereby pivot to a position in contact with the gear 41. In this way, when the movable part of the actuator 43 is at a predetermined first position, the arm 42 may wait at a position without engagement with the gear 41. When the movable part of the actuator 43 in operation moves to a predetermined second position, the arm 42 may pivot and engage with the gear 41 to lock the gear 41 and the wheel coupled to the gear 41.

An example of the actuator 43 may include a combination of a rotating motor and a screw nut that converts the rotary motion of the motor to linear motion. A movable part of the screw nut may be coupled to a linear cam that shifts, for example, in a direction along the rotary shaft of the arm 42 (a direction perpendicular to the page of FIG. 1). The linear cam may come into contact with a portion of the arm 42 to pivot the arm 42. Note that, a spring may be disposed between the movable part and the linear cam so as to prevent the linear cam from moving in a direction that causes the arm 42 to push the gear 41 even when the movable part shifts to the second position during high-speed rotation of the gear 41.

The sensor 44 may output sensor signals indicating a shift or a position of the movable part of the actuator 43. The sensor 44 may detect the shift or the position of the movable part using electromagnetic action. Alternatively, the sensor 44 may detect the shift or the position of the movable part without using electromagnetic action. An example of the sensor 44 may include a rotary encoder that outputs two-phase pulsed signals or sinusoidal signals corresponding to the angle of rotation of the output shaft of the motor. The two-phase pulsed signals or the sinusoidal signals may have a phase difference of, for example, 90 degrees. Such a configuration allows the control apparatus 20 that has received the sensor signals to determine the rotation direction on the basis of the phase difference of the sensor signals, and to count the peaks or valleys of the sensor signals to determine the number of rotations. The control apparatus 20 may add a positive or negative sign to the number of rotations in accordance with the direction of the rotation, and calculate the cumulative number of rotations to determine the position of the movable part.

In the case where the sensor 44 is a rotary encoder, abnormal two-phase sensor signals having a phase difference exceeding the normal range or abnormal sensor signals having voltages fluctuating beyond the normal range can be generated from the sensor 44 due to an external magnetic field acting on the sensor 44 or the signal line of the sensor 44, for example. The abnormal sensor signals can lower the reliability of the counted value indicating the position of the movable part of the actuator 43. When the counted value has low reliability, the movable part of the actuator 43 may be moved to a reference position (a position at the leading end or the trailing end), and the counted value of the encode signal may be reset. In this way, it is possible to count the position of the movable part with high reliability.

Note that the sensor 44 may have any other configuration besides that described above. Alternatively, the sensor 44 may be, for example, a proximity switch that detects the position of the movable part. In the case where the sensor 44 is a proximity switch, abnormal sensor signals having voltages fluctuating beyond the normal range can be generated from the sensor 44 due to an external magnetic field acting on the sensor 44 or the signal line of the sensor 44. The abnormal sensor signals can hinder reliable determination of the position of the movable part of the actuator 43. In such a case, sensor signals of the sensor 44 may be rechecked after the removal of the cause of the abnormality. In this way, it is possible to determine the position of the movable part of the actuator 43 with high reliability.

Alternatively, the sensor 44 may be a stroke sensor that detects the position of the movable part. In the case where the sensor 44 is a stroke sensor, abnormal sensor signals indicating a position of the movable part deviating from a predetermined stroke can be generated from the sensor 44 due to an external magnetic field acting on the sensor 44 or the signal line of the sensor 44. The abnormal sensor signals can hinder reliable determination of the position of the movable part of the actuator 43. In such a case, sensor signals of the sensor 44 may be rechecked after the removal of the cause of the abnormality. In this way, it is possible to determine the position of the movable part of the actuator 43 with high reliability.

In one embodiment, the sensor 44 may serve as a "parking lock sensor".

The control apparatus 20 may include one electronic control unit (ECU) or multiple ECUs communicating with each other. The ECU may include a central processing unit (CPU), a memory that stores control programs and control data executed by the CPU, a random-access memory in which the CPU loads data, and a microcomputer that includes an input/output (I/O) port that receives signals from an external device and outputs signals to the external device. The control apparatus 20 may include the CPU to execute a control program at a predetermined calculation cycle, and implement multiple functional modules by executing the control program. The functional modules implemented by the control apparatus 20 may be a positioning unit that positions the power receiving coil 14 or assist in positioning the power receiving coil 14 before the start of wireless charging, and an examination unit that checks whether a wheel is locked by the parking lock mechanism 40, i.e., whether the wheel is in a locked or unlocked state. In addition, the functional modules may include an error memory unit that records the occurrence of an error in the parking lock mechanism 40 while the power transmitting coil 103 is subjected to excitation weaker than the excitation for electrical power transmission, i.e., for wireless charging.

The power transmission facility 100 may include the power transmitting coil 103 that allows for wireless power transmission, an inverter 102 that outputs an alternating current to the power transmitting coil 103, a communication unit 106 that wirelessly communicates with the electric vehicle 1, and a power transmission facility controller 105 that performs drive control of the power transmitting coil 103. The power transmitting coil 103 according to the embodiment may be disposed outside the electric vehicle 1, e.g., on the ground in a space in which the electric vehicle 1 may enter. The power transmission facility controller 105 may receive a request from the electric vehicle 1 via the communication unit 106, and control the driving of the inverter 102 on the basis of the request. Examples of the request from the electric vehicle 1 may include an excitation request for electrical power transmission, a stop request for stopping the excitation for electrical power transmission, an excitation request for positioning, and a stop request for stopping the excitation for positioning. In response to the excitation request for electrical power transmission, the power transmission facility controller 105 may drive the inverter 102 to excite the power transmitting coil 103 for electrical power transmission. In response to the excitation request for positioning, the power transmission facility controller 105 may drive the inverter 102 to subject the power transmitting coil 103 to excitation weaker than the excitation for electrical power transmission.

[Wireless Charge Transition Process]

Figure 2:
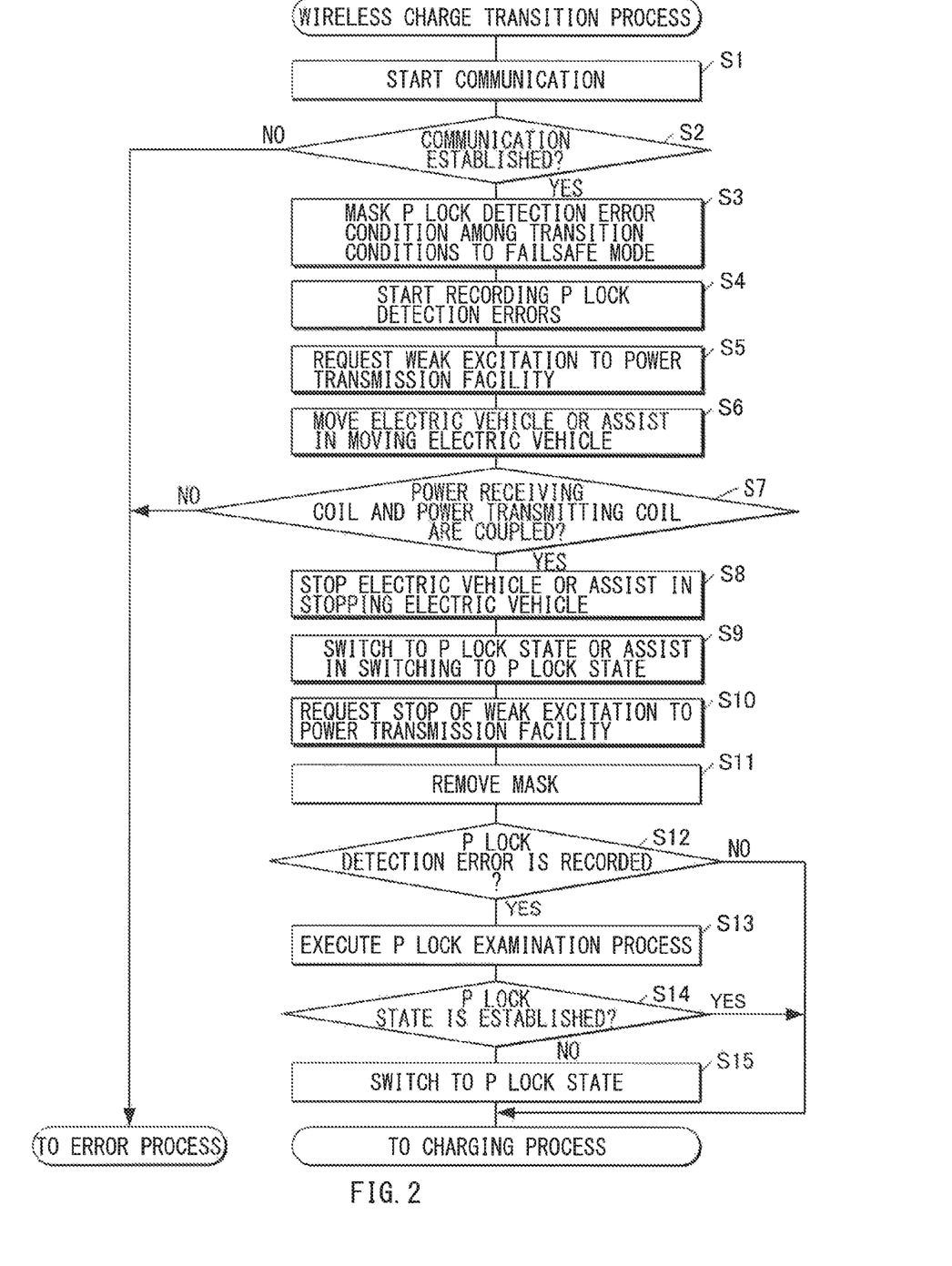
FIG. 2 is a flowchart illustrating a wireless charge transition process executed by the wireless charge system according to an embodiment.

FIG. 2 is a flowchart illustrating a wireless charge transition process executed by the control apparatus 20. The wireless charge transition process may be started when the driver operates the wireless-charge transition switch 32 near the power transmission facility 100, to wirelessly charge the electric vehicle 1.

It is desirable that, before transition to the wireless charging process, the parking lock mechanism locks a wheel after the power receiving coil is positioned in place by the positioning of the power receiving coil so as to prevent the electric vehicle from being displaced and the positioning process ends. However, during the positioning of the power receiving coil, a magnetic field generated by the power transmitting coil can act on the sensors of the parking lock mechanism, which can hinder the reliability of the sensor signals. That is, the magnetic field generated by the power transmitting coil can affect the sensors in such way that the sensor signals falsely indicate that a wheel is locked by the parking lock mechanism, even when the wheel is not actually locked. An electromagnetic shield may be provided around the parking lock mechanism to prevent the sensors of the parking lock mechanism from being affected by the magnetic field generated by the power transmitting coil. However, the addition of an electromagnetic shield can cause an increase in the vehicle weight and the manufacturing cost. In contrast, during wireless charging according to the embodiment of the technology, it is possible to start wireless transmission of electrical power with high reliability while the electric vehicle is prevented from being displaced.

When the wireless charge transition process starts, the control apparatus 20 may start communication with the power transmission facility 100 via the communication units 15 and 106 (Step S1). The control apparatus 20 then may determine whether communication with the power transmission facility 100 is established (Step S2). If communication is not established in a predetermined time (Step S2: NO), the control apparatus 20 may cause the procedure to proceed to an error process. If communication is established (Step S2: YES), the procedure may proceed to the next step.

In Step S3, the control apparatus 20 may mask a transition condition by a P lock detection error of the parking lock mechanism 40 among transition conditions for transiting to a predetermined failsafe mode (Step S3). Concurrently with the wireless charge transition process, the control apparatus 20 may repeat a verification process of checking for abnormalities in the sensor signals from the sensor 44 in a short cycle. If an abnormality is detected, the control apparatus 20 may identify the abnormality as a P lock detection error. The abnormal sensor signals have already been described above in relation with the sensor 44. Concurrently with other control processes, the control apparatus 20 may perform a failsafe control process to initiate a failsafe mode of the electric vehicle 1 when abnormalities are detected in various sensor signals. After the failsafe mode is initiated, the control apparatus 20 may notify the passenger of the electric vehicle 1 about the site of the abnormality, and restrict the operation of the electric vehicle 1. The term "mask" in Step S3 refers to the act of masking a transition condition so as to avoid initiating the failsafe mode in the failsafe control process when a P lock detection error is identified.

The control apparatus 20 then may start recording P lock detection errors (Step S4), and send a request of weak excitation (excitation for positioning) to the power transmission facility 100 via the communication units 15 and 106 (Step S5). In response to the request, the power transmission facility controller 105 of the power transmission facility 100 may drive the inverter 102 and subject the power transmitting coil 103 to excitation weaker than the excitation for electrical power transmission.

The control apparatus 20 then may move the electric vehicle 1 or assist in moving the electric vehicle 1 to position the power receiving coil 14 (Step S6). For example, in the case where the electric vehicle 1 is provided with a self-driving system, the control apparatus 20 may drive the steering wheel and the travel motor 10 using the self-driving system to move the electric vehicle 1. In the case where the electric vehicle 1 is not provided with a self-driving system, the control apparatus 20 may assist the driver in moving the electric vehicle 1 by providing an audio output or a display output that instructs the driver in how to move the electric vehicle 1, e.g., the direction and distance in which the electric vehicle is to be moved. The control apparatus 20 may repeatedly detect the magnitude of the induced electromotive force of the power receiving coil 14, and determine, on the basis of the results of the detection, whether the power receiving coil 14 and the power transmitting coil 103 have moved close to or away from each other. On the basis of the results of the determination, the control apparatus 20 may move the electric vehicle 1 so as to appropriately position the power receiving coil 14 relative to the power transmitting coil 103, for example, to a position in which the coils 14 and 103 face each other.

The control apparatus 20 may determine a satisfactory coupled state of the power receiving coil 14 and the power transmitting coil 103, for example, at a timing immediately before the power receiving coil 14 reaches a position facing the power transmitting coil 103 (Step S7). After the satisfactory coupled state is established (Step S7: YES), the control apparatus 20 may stop the electric vehicle 1 or stop assisting the electric vehicle 1 (Step S8). The control apparatus 20 then may switch the shift position to the park position or assist in switching the shift position to the park position, to drive the parking lock mechanism 40 so as to lock the wheel by latching the arm 42 to the gear 41 (hereinafter this state is referred to as a "P lock state") (Step S9). For example, in the case where the electric vehicle 1 is provided with a self-driving system, the control apparatus 20 may drive the brakes to stop the electric vehicle 1 and move the shift position to the park position using the self-driving system. In the case where the electric vehicle 1 is not provided with a self-driving system, the control apparatus 20 may assist the driver in stopping the electric vehicle 1 and shifting to the park position by providing an audio output or a display output that instructs the driver in stopping the electric vehicle 1.

If the satisfactory coupled state is not determined in Step S7 in a predetermined time (Step S7: NO), the control apparatus 20 may cause the procedure to proceed to the error process. In the error process, the control apparatus 20 may send a request to the power transmission facility 100 to stop the weak excitation (excitation for positioning), and end the wireless charge transition process and the wireless charging process.

When the P lock state is established in Step S9, the control apparatus 20 may send a request to the power transmission facility 100 via the communication units 15 and 106 to stop the weak excitation (Step S10). When the weak excitation of the power transmitting coil 103 stops, the control apparatus 20 may remove the mask applied in Step S3 (Step S11).

In the wireless charge transition process, the weak excitation of the power transmitting coil 103 may continue until the electric vehicle 1 is completely stopped by the parking lock mechanism 40, as described in Steps S8 to S10. In this way, the control apparatus 20 may cause the procedure to transit to the charging process after determining whether the power receiving coil 14 and the power transmitting coil 103 are positioned at appropriate relative positions where the wheel of the electric vehicle 1 is locked.

The control apparatus 20 then may determine whether a P lock detection error is recorded in the memory process, which starts from Step S4 (Step S12). If abnormal sensor signals are generated from the sensor 44 of the parking lock mechanism 40 due to the weak excitation of the power transmitting coil 103 during positioning of the power receiving coil 14 in Steps S6 to S9, the reliability of proper switching to the P lock state in Step S9 can be lowered. Hence, the control apparatus 20 may determine whether switching to the P lock state has been properly performed in Step S12.

If the result of the determination in Step S12 indicates that a P lock detection error is not recorded (Step S12: NO), it may be determined that switching to the P lock state has been properly performed in Step S9. Thus, the control apparatus 20 may cause the procedure to proceed to the charging process. In the charging process, the power transmitting coil 103 may be excited for electrical power transmission in response to a request for electrical power transmission from the control apparatus 20, and a charge current may be fed from the power receiving coil 14 to the high-voltage battery 12 through the charger 13.

If the result of the determination in Step S12 indicates that a P lock detection error is recorded (Step S12: YES), it may be determined that the reliability of proper switching to the P lock state in Step S9 is low. Hence, the control apparatus 20 performs an examination process to check whether the parking lock mechanism 40 is in the P lock state (Step S13).

In the case where the sensor 44 is a rotary encoder that detects the rotation of the motor of the actuator 43, the control apparatus 20 performs the examination process as described below. The control apparatus 20 may first move the movable part of the actuator 43 to a reference position (a leading end position or a trailing end position) and reset an encode signal counter. The control apparatus 20 then may return the movable part to the original position before being moved to the reference position, and check the count value of the encode signals to determine the position of the movable part. In this examination process, the counter may be reset and the encode signals may be counted without excitation of the power transmitting coil 103. This enables the control apparatus 20 to confirm the position of the movable part with high reliability.

In the case where the sensor 44 is a proximity switch or a stroke sensor that detects the position of the movable part of the actuator 43, the control apparatus 20 may reinput the sensor signals of the sensor 44 to confirm the position of the movable part of the actuator 43. In this examination process, the sensor signals may be input without excitation of the power transmitting coil 103. This enables the control apparatus 20 to confirm the position of the movable part with high reliability.

The control apparatus 20 may then determine whether the P lock state is established on the basis of the position of the movable part (Step S14). If the P lock state is established (Step S14: YES), the control apparatus 20 may cause the procedure to proceed to the charging process. If the P lock state is not established (Step S14: NO), the control apparatus 20 may drive the actuator 43 to cause switching to the P lock state (Step S15), and then cause the procedure to proceed to the charging process.

In one embodiment of the technology, Step S4 in the wireless charge transition process illustrated in FIG. 2 may correspond to a process executed by the error memory unit. In one embodiment of the technology, Steps S5 to S9 may correspond to a process executed by the positioning unit. In one embodiment of the technology, Steps S12 to S14 may correspond to a process executed by the examination unit. In one embodiment of the technology, Step S15 may correspond to a process executed by a lock signal output unit.

As described above, the control apparatus 20 (the positioning unit) of the electric vehicle 1 according to the embodiment positions the power receiving coil 14 or assists in positioning the power receiving coil 14 on the basis of the quantity of electricity generated at the power receiving coil 14 receiving a magnetic field of the power transmitting coil 103 subjected to excitation weaker than the excitation for electrical power transmission (Steps S6 to S8). If abnormal sensor signals are output from the sensor 44 due to the magnetic field generated by the power transmitting coil 103 after the parking lock mechanism 40 is locked into the P lock state at the end of the positioning of the power receiving coil 14, the reliability of proper switching to the P lock state can be lowered. However, in the electric vehicle 1 according to the embodiment, the control apparatus 20 (the examination unit) checks the P lock state after the stop of the weak excitation of the power transmitting coil 103 and before the start of electrical power transmission by the power transmitting coil 103 (Steps S13 and S14). Thus, if it is determined that a P lock state has not been properly established through the examination process, the P lock state may be established by relocking the wheel. In this way, it is possible to start wireless power transmission while the wheel of the electric vehicle 1 is certainly locked by the parking lock mechanism 40. This enables highly effective electrical power transmission while preventing the power receiving coil 14 from being displaced during the electrical power transmission.

The control apparatus 20 (the positioning unit) of the electric vehicle 1 according to the embodiment stops the electric vehicle 1 or assists in stopping the electric vehicle 1 when the power receiving coil 14 is positioned (Step S8). The control apparatus 20 then may cause the parking lock mechanism 40 to switch to the P lock state or assist in switching to the P lock state (Step S9). The control apparatus 20 then may send a request for stopping the weak excitation of the power transmitting coil 103 (Step S10). Through such a control process, the weak excitation of the power transmitting coil 103 may continue until the wheel is locked by the parking lock mechanism 40 and the electric vehicle 1 completely stops. In this way, the control apparatus 20 may determine whether the power receiving coil 14 is in place relative to the power transmitting coil 103 by using the weak excitation of the power transmitting coil 103 with the electric vehicle 1 in a completely stopped state. After the power receiving coil 14 is positioned in place, the control apparatus 20 may start the charging process.

If a P lock detection error occurs as a result of abnormal sensor signals from the sensor 44 of the parking lock mechanism 40 during positioning of the power receiving coil 14, the control apparatus 20 (the error memory unit) of the electric vehicle 1 according to the embodiment may record this P lock detection error. If a P lock detection error is not recorded during positioning of the power receiving coil 14, the control apparatus 20 (the examination unit) may omit the examination process for checking whether the parking lock mechanism 40 is in the P lock state. Thus, if the reliability of switching to the P lock state is not lowered, the examination process (Step S13) may be omitted. This shortens the time to the start of the charging.

Modification

Figure 3:
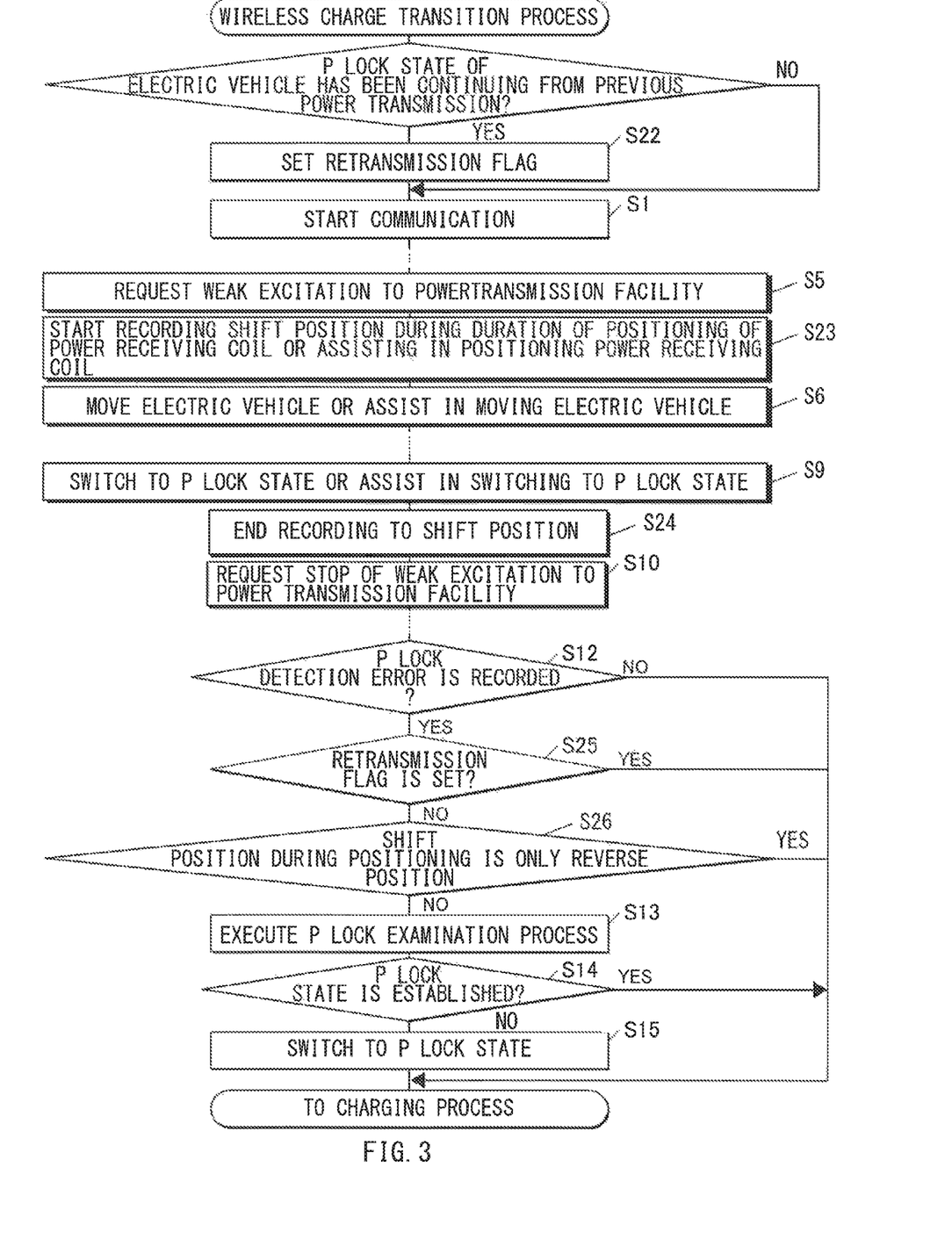
FIG. 3 is a flowchart illustrating a wireless charge transition process according to a modification executed by the wireless charge system according to an embodiment.

The parking lock mechanism 40 of the electric vehicle 1 according to a modification of this embodiment may be disposed in front of the power receiving coil 14 and lock a front wheel.

FIG. 3 is a flowchart illustrating a wireless charge transition process according to the modification executed by the control apparatus 20. In the wireless charge transition process according to the modification, several Steps are added to the above-described wireless charge transition process (see FIG. 2). The added steps will now be described.

When the wireless-charge transition switch 32 is operated near the power transmission facility 100 and the wireless charge transition process starts, the control apparatus 20 may first determine whether the P lock state has been continuing since the previous electrical power transmission (Step S21). The control apparatus 20 may check whether the shift position has remained unchanged in the park range since the previous electrical power transmission, to determine whether the P lock state has been continuing. If it is determined in Step S21 that the P state has been continuing (Step S21: YES), the control apparatus 20 may set a retransmission flag (Step S22). The control apparatus 20 then may cause the procedure to proceed to Step S1. If it is determined in Step S21 that the P lock state has not been continuing (if the P lock is released or temporarily released) (Step S21: NO), the control apparatus 20 may cause the procedure to proceed to Step S1. Electrical power may be retransmitted in some cases, e.g., when electrical power is consumed via an in-vehicle power outlet or by the in-vehicle air conditioner and retransmission of electrical power is required.

The subsequent Steps S1 to S12 may be as described above. However, the control apparatus 20 may start recording the shift position (Step S23) before Steps S6 to S9 for positioning of the power receiving coil 14 or assisting in the positioning. After Steps S6 to S9, the control apparatus 20 may end the recording of the shift position (Step S24). The shift position may be recorded as the drive position when the power receiving coil 14 is positioned by moving the electric vehicle 1 forward. The shift position may be recorded as the reverse position when the power receiving coil 14 is positioned by moving the electric vehicle 1 backward. If the power receiving coil 14 is positioned by moving the electric vehicle 1 forward and backward, the drive position and the reverse position may be alternately recorded at multiple timings. The data on the shift position may be stored in correspondence with timing data of the positioning.

In the wireless charge transition process according to the modification, conditions for omitting the P lock examination process includes the presence of a record of a P lock detection error, as well as the presence of a set retransmission flag and the shift position during the positioning of the power receiving coil 14. The control apparatus 20 may determine whether these conditions are satisfied in Steps S12, S25, and S26. If a P lock detection error is not recorded (Step S12: NO), or if a retransmission flag is set (Step S25: YES), or if the shift position during positioning of the power receiving coil 14 is only the reverse position (Step S26: YES), the control apparatus 20 may cause the procedure to skip Steps S13 to S15 and end the wireless charge transition process. The procedure then may proceed to the charging process. Note that the determination process of Step S26 is not limited to determination based on data on the shift position during the entire duration of positioning. For example, the determination may alternatively be based on data on the shift position after positioning and before establishing the P lock state, the shift position before the start of positioning, the shift positions at multiple timings during positioning, or a combination of these shift positions.

In the electric vehicle 1 according to the modification of the embodiment described above, if a request for electrical power transmission is resent while the P lock state of the electric vehicle 1 has been continuing since the previous electrical power transmission or if the shift position during the positioning is only the reverse position, the control apparatus 20 may omit the examination process for checking whether the parking lock mechanism 40 is in the P lock state. In the case of the retransmission of electrical power, it may be presumed that the reliability of the parking lock mechanism 40 has not been compromised because the electric vehicle 1 has not been moved before the retransmission of electrical power by the power transmitting coil 103. Also, when the power receiving coil 14 is positioned while the shift position is the reverse position, it may be presumed that the reliability of the parking lock mechanism 40 has not been compromised because the parking lock mechanism 40 is disposed remote from the power transmitting coil 103. By omitting the examination process (Step S13) when the reliability of the parking lock mechanism 40 is not compromised, it is possible to shorten the time to the start of charging.

In this modification, the parking lock mechanism 40 may be disposed in front of the power receiving coil 14 and lock a front wheel. Alternatively, the parking lock mechanism 40 may be disposed behind the power receiving coil 14 and lock a rear wheel. In such a case, the control apparatus 20 may determine whether the shift position remains in the drive position during the positioning.

While some of the embodiments of the technology have been described above, the embodiments should not be limited thereto. For example, in at least one of the above-described embodiments, the control apparatus 20 may be a single controller including a control unit configured to control the operation of the electric vehicle 1 and a control unit configured to control wireless charging of the high-voltage battery 12 as an integrated component. Alternatively, for example, the electric vehicle 1 may include multiple independent control units that implement a control unit configured to control the travel motor 10, a control unit configured to perform comprehensive control of the electric vehicle 1 including distribution of the driving torque between the engine (not illustrated) and the travel motor 10, and a control unit configured to control the wireless charging. The multiple control units may communicate with each other to perform control operations. The wireless power feeding control apparatus having such a configuration according to an embodiment of the technology may serve only as a control unit configured to control wireless charging or may serve as both a control unit configured to control wireless charging and a control unit configured to perform other control operations.

In at least one of the above-described embodiments, the control apparatus 20 may record the occurrence of a P lock detection error during weak excitation of the power transmitting coil 103 (Step S4), and only when there is such a record, the control apparatus 20 may perform an examination process of the P lock state after the stop of the weak excitation (Steps S12 and S13). However, in another embodiment, the recording process in Step S4 and the process of determining a record in Step S12 may be omitted, and the examination process of the P lock state in Step S13 may be performed during every wireless charge transition process. The flowchart illustrated in FIG. 2 does not include a step of rechecking displacement of the power receiving coil 14 after the switching to the P lock state (Step S9). However, in another embodiment, the control apparatus 20 may recheck whether the power receiving coil 14 is in place relative to the power transmitting coil 103 after switching to the P lock state (Step S9) and before sending a request for stopping the weak excitation (Step S10).

In the wireless charge transition process according to the modification, the P lock examination process may be omitted when the following three conditions are satisfied: a P lock detection error is not recorded; the P lock state have been continuing from the previous electrical power transmission; and the shift position satisfies a predetermined condition during positioning of the power receiving coil 14. However, in another embodiment, the P lock examination process may be omitted when only one or two of the three conditions are satisfied.

In at least one of the above-described embodiments of the technology, the control apparatus 20 of the electric vehicle 1 performs positioning of the power receiving coil 14 or assistance in the positioning of the power receiving coil 14, and checks the P lock state of the electric vehicle 1 after the stop of the weak excitation of the power transmitting coil 103 and before the start of electrical power transmission. However, in another embodiment, the process of assisting in positioning the power receiving coil 14 may be executed at the power transmission facility 100. For example, a control unit (for example, the power transmission facility controller 105) of the power transmission facility 100 may assist in positioning the power receiving coil 14 by receiving the quantity of electricity generated at the power receiving coil 14 by excitation of the power transmitting coil 103 from the electric vehicle 1 via communication and instructing the driver, by a lamp or sound, to move or stop the electric vehicle 1 in accordance with the quantity of electricity. Thus, the positioning unit that assists in positioning the power receiving coil 14 may be disposed in the power transmission facility 100. The other details described in the above-described embodiments and modification, such as specific structural examples of the parking lock mechanism 40, may be modified as appropriate without departing from the spirit of the technology.

As described above, the reliability of the sensor signals indicative of the operation of the parking lock mechanism can be lowered by weak excitation of the power transmitting coil for positioning the power receiving coil. However, in at least one of the above-described embodiments of technology, the examination unit may check the locked state of the wheel established by the parking lock mechanism after the stop of the weak excitation of the power transmitting coil and before the start of electrical power transmission by the power transmitting coil. This enables highly reliable checking of the locked state of the wheel without the influence of the electromagnetic action caused by the excitation. Thus, it is possible to transmit electrical power from the power transmitting coil while the electric vehicle is certainly fixed at a predetermined position by the parking lock mechanism.

One or both of the positioning unit and the examination unit in the control apparatus 20 illustrated in FIG. 1 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the positioning unit and the examination unit. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the positioning unit and the examination unit in the control apparatus 20 illustrated in FIG. 1.

Although some example configurations, example processing and modification examples according to an embodiment of the technology are described hereinabove, the foregoing embodiments are mere examples and are not intended to limit the scope of the technology. It should be also appreciated that various omissions, replacements, and modifications may be made in the foregoing embodiments described herein, without departing from the scope of the spirit of the technology. The technology is intended to include such modifications and alterations in so far as they fall within the scope of the appended claims or the equivalents thereof.

The invention claimed is:

1. A wireless power feeding control apparatus for a vehicle, the vehicle being provided with a power receiving coil configured to wirelessly receive electrical power from a power transmitting coil of a power transmission facility, a parking lock mechanism, and a parking lock sensor configured to output an electrical signal corresponding to a locked state of a wheel established by the parking lock mechanism, the wireless power feeding control apparatus comprising:

a positioning unit configured to perform or assisting positioning of the power receiving coil on a basis of a quantity of electricity generated by the power receiving coil receiving a magnetic field from the power transmitting coil subjected to weak excitation weaker than excitation during electrical power transmission; and an examination unit configured to execute an examination process of checking the locked state of the wheel established by the parking lock mechanism after the weak excitation of the power transmitting coil is stopped and before the electrical power transmission by the power transmitting coil is started.

2. The wireless power feeding control apparatus according to claim 1, further comprising a communication unit configured to communicate with the power transmission facility, wherein, when the power transmitting coil and the power receiving coil are in place, the positioning unit is configured to stop the vehicle or assist in stopping the vehicle, lock the wheel by the parking lock mechanism or assist in locking the wheel by the parking lock mechanism, and subsequently send a request for stopping the weak excitation of the power transmitting coil to the power transmission facility via the communication unit.

3. The wireless power feeding control apparatus according to claim 1, further comprising an error memory unit configured to record an occurrence of an error of the parking lock mechanism, the error occurring while the power transmitting coil is subjected to the weak excitation by the positioning unit, wherein, after the positioning of the power receiving coil or the assisting in the positioning of the power receiving coil, the examination unit is configured to execute the examination process if the occurrence of an error is recorded in the error memory unit and refrain from executing the examination process if the occurrence of an error is not recorded in the error memory unit.

4. The wireless power feeding control apparatus according to claim 2, further comprising an error memory unit configured to record an occurrence of an error of the parking lock mechanism, the error occurring while the power transmitting coil is subjected to the weak excitation by the positioning unit, wherein, after the positioning of the power receiving coil or the assisting in the positioning of the power receiving coil, the examination unit is configured to execute the examination process if the occurrence of an error is recorded in the error memory unit and refrain from executing the examination process if the occurrence of an error is not recorded in the error memory unit.

5. The wireless power feeding control apparatus according to claim 1, wherein the examination unit is configured to switch the examination process between being executed and not being executed depending on a shift position during the positioning of the power receiving coil or the assisting in the positioning of the power receiving coil.

6. The wireless power feeding control apparatus according to claim 2, wherein the examination unit is configured to switch the examination process between being executed and not being executed depending on a shift position during the positioning of the power receiving coil or the assisting in the positioning of the power receiving coil.

7. The wireless power feeding control apparatus according to claim 3, wherein the examination unit is configured to switch the examination process between being executed and not being executed depending on a shift position during the positioning of the power receiving coil or the assisting the positioning of the power receiving coil.

8. The wireless power feeding control apparatus according to claim 4, wherein the examination unit is configured to switch the examination process between being executed and not being executed depending on a shift position during the positioning of the power receiving coil or the assisting in the positioning of the power receiving coil.

9. The wireless power feeding control apparatus according to claim 1, wherein, after the electrical power transmission from the power transmitting coil to the power receiving coil and when a request for another electrical power transmission is sent to the power transmission facility without the locked state of the wheel established by the parking lock mechanism being released, the examination unit is configured to refrain from executing the examination process.

10. The wireless power feeding control apparatus according to claim 2, wherein, after the electrical power transmission from the power transmitting coil to the power receiving coil and when a request for another electrical power transmission is sent to the power transmission facility without the locked state of the wheel established by the parking lock mechanism being released, the examination unit is configured to refrain from executing the examination process.

11. The wireless power feeding control apparatus according to claim 3, wherein, after the electrical power transmission from the power transmitting coil to the power receiving coil and when a request for another electrical power transmission is sent to the power transmission facility without the locked state of the wheel established by the parking lock mechanism being released, the examination unit is configured to refrain from executing the examination process.

12. The wireless power feeding control apparatus according to claim 4, wherein, after the electrical power transmission from the power transmitting coil to the power receiving coil and when a request for another electrical power transmission is sent to the power transmission facility without the locked state of the wheel established by the parking lock mechanism being released, the examination unit is configured to refrain from executing the examination process.

13. The wireless power feeding control apparatus according to claim 1, further comprising
a lock-signal output unit configured to output a signal to the parking lock mechanism, the signal instructing the parking lock mechanism to lock the wheel depending on a result of the examination process of checking the locked state by the examination unit.

14. The wireless power feeding control apparatus according to claim 2, further comprising
a lock-signal output unit configured to output a signal to the parking lock mechanism, the signal instructing the parking lock mechanism to lock the wheel depending on a result of the examination process of checking the locked state by the examination unit.

15. The wireless power feeding control apparatus according to claim 3, further comprising
a lock-signal output unit configured to output a signal to the parking lock mechanism, the signal instructing the parking lock mechanism to lock the wheel depending on a result of the examination process of checking the locked state by the examination unit.

16. The wireless power feeding control apparatus according to claim 4, further comprising
a lock-signal output unit configured to output a signal to the parking lock mechanism, the signal instructing the parking lock mechanism to lock the wheel depending on a result of the examination process of checking the locked state by the examination unit.

17. A wireless charge system for a vehicle, the wireless charge system comprising:
a power transmission facility including a power transmitting coil;
a power receiving coil configured to wirelessly receive electrical power from the power transmitting coil;
a charger coupled to the power receiving coil and configured to generate charging power corresponding to the electrical power from the power transmitting coil;
a parking lock mechanism;
a parking lock sensor configured to output an electrical signal corresponding to a locked state of a wheel established by the parking lock mechanism; and
a controller configured to
perform or assisting positioning of the power receiving coil on a basis of a quantity of electricity generated by the power receiving coil receiving a magnetic field from the power transmitting coil subjected to weak excitation weaker than excitation during electrical power transmission, and
check the locked state of the wheel established by the parking lock mechanism after the weak excitation of the power transmitting coil is stopped and before the electrical power transmission by the power transmitting coil is started.

18. A wireless power feeding control apparatus for a vehicle, the vehicle being provided with a power receiving coil configured to wirelessly receive electrical power from a power transmitting coil of a power transmission facility, a parking lock mechanism, and a parking lock sensor configured to output an electrical signal corresponding to a locked state of a wheel established by the parking lock mechanism, the wireless power feeding control apparatus comprising circuitry configured to
subject the power transmitting coil to weak excitation weaker than excitation during electrical power transmission,
detect a quantity of electricity generated at the power receiving coil receiving a magnetic field from the power transmitting coil subjected to the weak excitation,
position the power receiving coil or assisting positioning the power receiving coil on a basis of the detected quantity of electricity, and
check the locked state of the wheel established by the parking lock mechanism after the weak excitation of the power transmitting coil is stopped and before the electrical power transmission by the power transmitting coil is started.

* * * * *